United States Patent [19]

Hwang

[11] Patent Number: 4,782,409
[45] Date of Patent: Nov. 1, 1988

[54] TAPE CASSETTE LOADING DEVICE

[75] Inventor: Hak S. Hwang, Seoul, Rep. of Korea

[73] Assignee: Goldstar Co., Ltd., Seoul, Rep. of Korea

[21] Appl. No.: 946,030

[22] Filed: Dec. 24, 1986

[30] Foreign Application Priority Data

Dec. 27, 1985 [KR] Rep. of Korea ............................ 17744

[51] Int. Cl.⁴ ...................... G11B 5/008; G11B 15/00; G11B 17/00
[52] U.S. Cl. ........................................ 360/96.5; 360/93
[58] Field of Search ........................ 360/96.5, 93, 96.6; 242/197–200

[56] References Cited

U.S. PATENT DOCUMENTS 4,628,382 12/1986 Okumura .......................... 360/96.5
4,661,867 4/1987 Tsubota .............................. 360/96.5

FOREIGN PATENT DOCUMENTS 0151354 8/1984 Japan ................................. 360/96.5
0191167 10/1984 Japan ................................. 360/96.5

Primary Examiner—John H. Wolff
Assistant Examiner—David J. Severin
Attorney, Agent, or Firm—Birch, Stewart, Kolasch & Birch

[57] ABSTRACT

A tape cassette loading device comprising a lever pivotally fixed to the peripheral surface of an arm gear having an upright protrusion thereon and forward and backward inclined portions therebelow, a contacting member protruded below a worm wheel to contact the upright protrusion of the lever, and a generally arcuate slot formed on a bracket whereby when a guide pin of a cassette carrier passes through a corner portion of a guide groove, the upright protrusion of the lever is engaged with the contacting member so that the driving force of the worm wheel is directly transmitted to the arm gear.

1 Claim, 1 Drawing Sheet

TAPE CASSETTE LOADING DEVICE

BACKGROUND OF THE INVENTION

The present invention relates to a tape cassette loading device for a cassette type video tape recorder, and more particularly to a tape cassette loading device which may provide a smooth unloading of a cassette carrier.

In a conventional art to which the present invention pertains, there is a cassette loading device which comprises a worm wheel interlocked with a worm which is mounted on an axle of a driving motor, and an arm gear positioned coaxially with the worm wheel, the worm wheel being connected to the arm gear with a coil spring through an opening formed on the worm wheel. However, in such prior loading device, a large amount of load is applied to the arm gear during passing the turn-around portion, i.e., corner portion of a guide groove formed in a bracket in unloading mode, on the contrary, the worm wheel is intended to rotate with the same velocity so that the spring interconnected therebetween is stretched. In a while, this stretching force of the spring is converted into a restoring force so that the movement of the arm gear is abruptly effected and thus it affords shock to other components.

BRIEF SUMMARY OF THE INVENTION

It is therefore an object of the present invention to provide a loading device which may afford a smooth unloading of a cassette carrier.

To this end, the present invention further provides a lever having an upright protrusion thereon and forward and backward inclined portions therebelow, a contacting member formed below the worm wheel to contact the upright protrusion of the lever and to directly move the arm gear, and a slot formed on the bracket. The lever is fixed to the arm gear with an axle along with a wire spring which is biased against the lever in clockwise. The arm gear is provided with a pin adapted to engage one end of the spring and the other end is engaged with a pin formed on the lever and provided with a stopper to halt the clockwise advance of the lever.

BRIEF DESCRIPTION OF THE DRAWINGS

The above and other objects and many of the attendant advantages of this invention will be readily appreciated as the same becomes better understood by reference to the following detailed description when considered in connection with the accompanying drawings in which.

DETAILED DESCRIPTION OF THE INVENTION

Figure 1:
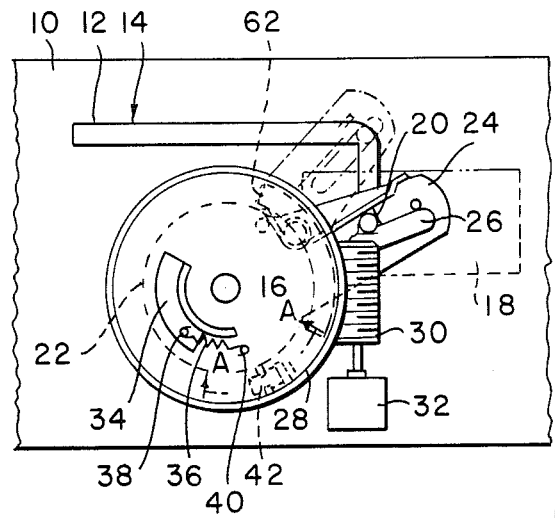
FIG. 1 is a schematic side elevational view of the cassette loading device according to the present invention.

Referring now to FIG. 1, there is shown a cassette loading device according to the present invention. Formed on a bracket 10 is a guide groove 12 having a transversal portion 14 and a longitudinal portion 16, in which a guide pin 20 of a cassette carrier 18 is slidably received. Pivotally fixed on the bracket 10 is an arm gear 22 having an arm 24 and its longitudinal slot 26 slidably receives the guide pin 20. Coaxially mounted on the arm gear 22 is a worm wheel 28 which is interlocked with a worm 30 mounted to an axle of a motor 32. The worm wheel 28 is provided with a generally arcuate opening 34 so that a coil spring 36 is interconnected between a protrusion 38 of the arm gear 22 exposed therethrough and a protrusion 40 thereon. Mounted with an axis 44 on the peripheral surface of the arm gear 22 is a lever 42 having an upright protrusion 46 disposed thereon and forward and backward inclined portions 48 and 50 disposed therebelow. A biassing means, for instance, a wire spring 52 is wound around the axle 44, one end thereof bears on a pin 54 and the other end thereof bears on a pin 56 of the lever 42 so that the lever 20 is biassed in clockwise direction as shown in FIGS. 2 to 5. The arm gear 22 is provided with a stopper 58 at its peripheral surface so as to prevent the further clockwise movement of the lever 42. Formed below the worm wheel 28 is a contacting member 60 which is adapted to engage the upright protrusion 46 and to directly transfer the driving force thereof to the arm gear 22. The bracket 10 is formed with a generally arcuate guide slot 62 so that when the lever 42 is resided in the slot 62 the driving force of the worm wheel 28 is transferred to the arm gear 22 through the coil spring 36, and that when the lever 42 rides on the bracket surface which is not formed with a groove the contacting member 60 is engaged with the upright protrusion 46 and thus the driving force thereof may be directly transferred to the arm gear 22, in unloading mode.

Figure 2:
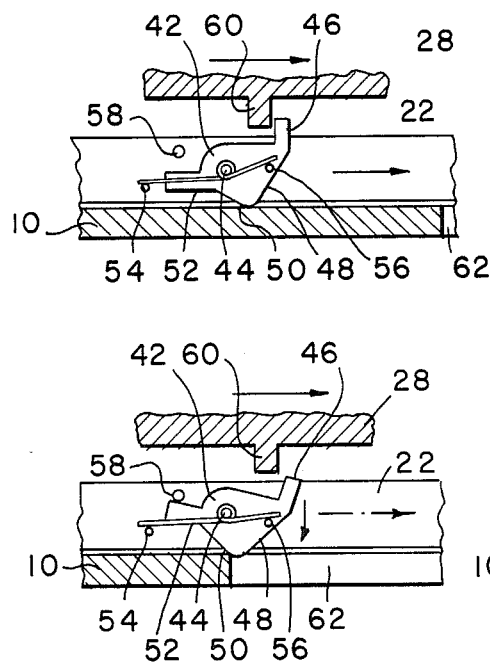
FIG. 2 is a sectional view of FIG. 1 taken along line A—A showing the operation of the loading device according to the present invention during the guide pin passing through the longitudinal position of the guide groove in unloading mode.
Figure 3:
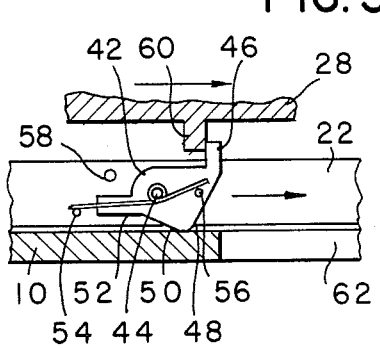
FIG. 3 is a sectional view of FIG. 1 showing the upright protrusion of the lever being engaged with the contacting member of the worm wheel during the guide pin passing through the turn-around portion of the guide groove.

With first regard to unloading mode, the driving motor 32 is rotated so that the worm wheel 28 is rotated in counterclockwise direction as shown in FIG. 1. At the beginning of unloading mode, the lever 42 rides on the bracket surface which is not formed with a groove but the upright protrusion thereof is not engaged with the contacting member of the worm wheel as shown in FIG. 2. The driving force of the worm wheel 28 is transferred to the arm gear 22 through the coil spring 36. Then, when the guide pin 20 of the cassette carrier 18 begins to turn the corner portion of the guide groove 12, the arm gear 22 is slightly prevented from advancing as mentioned hereinabove and thus the upright protrusion 46 of the lever 42 is engaged with the contacting member 60 of the worm wheel 28 as shown in FIG. 3. Thereby, the driving force of the worm wheel 28 may be directly transferred to the arm gear 22 through the engagement of the contacting member 60 and the upright protrusion 46.

Figures 4, 5:
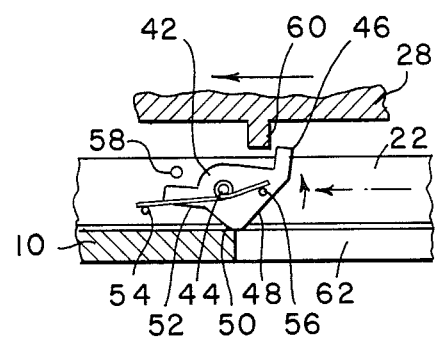
FIG. 4 is a sectional view of FIG. 1 showing the lever being slipped off the contacting member of the worm after the guide pin passing through the turn-around portion of the guide groove according to the present invention.
FIG. 5 is a sectional view of FIG. 1 showing the operation of the loading device according to the present invention when the guide pin begins to pass through the turn-around portion of the guide groove in loading mode.

After perfectly passing through the corner portion of the guide groove 12, the lever 42 is positioned in the slot 62 so that the upright protrusion 46 thereof is slipped off the contacting member 60 by the restoring force of spring 52 as shown in FIG. 4. Thereby, while the guide pin 20 passes along the transversal portion 14 of the groove 12, the driving force of the worm wheel 28 is transferred to the arm gear 22 through the spring 36.

Referring to FIG. 5, there is shown the operation of the present invention when the guide pin begins to turn the corner portion of the guide groove 12 in loading mode. The backward inclined portion 50 of the lever 42 is contacted with the bracket surface so that the upright protrusion 46 thereof is engaged with the contacting member 60 in the rear portion with respect to the advance direction of the worm wheel 28. Thereby, the advance of the worm wheel 28 and the arm gear 22 is not affected by the engagement of the contacting member 60 and the upright protrusion 46.

While the present invention has been described in its preferred embodiment, it is to be understood that the words which have been used are words of description rather than limitation and that changes within the purview of the appended claim may be made without departing from the true scope and spirit of the invention in its broader aspects.

What is claimed is:

1. A tape cassette loading device comprising in combination:
    a bracket,
    a guide groove formed on said bracket for slidably receiving a guide pin of a cassette carrier,
    an arm gear having an arm which includes a longitudinal slot for slidably receiving said guide pin to move said cassette carrier between a loaded and an unloaded state,
    a worm wheel coaxially mounted on said arm gear and interlocked with a worm which is connected to a motor,
    a coil spring having a first end fixed to a protrusion of said arm gear through an arcuate opening formed on said worm wheel and a second end fixed to a protrusion of said worm wheel for transmitting the driving force of said worm wheel to said arm gear,
    a lever mounted to an axle at the peripheral surface of said arm gear, said lever including an upright protrusion and forward and backward inclined portions opposite to said upright protrusion, respectively, for transmitting the driving force of said worm wheel directly to said arm gear,
    a wire spring wound around said axle of said lever for resiliently biasing said lever,
    a stopper protruded from the arm gear limiting the rotation of said lever by said wire spring,
    a contacting member formed on the peripheral surface of said worm wheel for engaging with said upright protrusion of said lever thereby directly transmitting the driving force of said worm wheel to said arm gear, and
    an arcuate slot formed on said bracket for receiving said forward and backward inclined portions of said lever to disengage said lever and said contacting member when said lever resides in said arcuate slot whereby said coil spring transmits the driving force of said worm wheel to said arm gear.

* * * * *